UNITED STATES PATENT OFFICE.

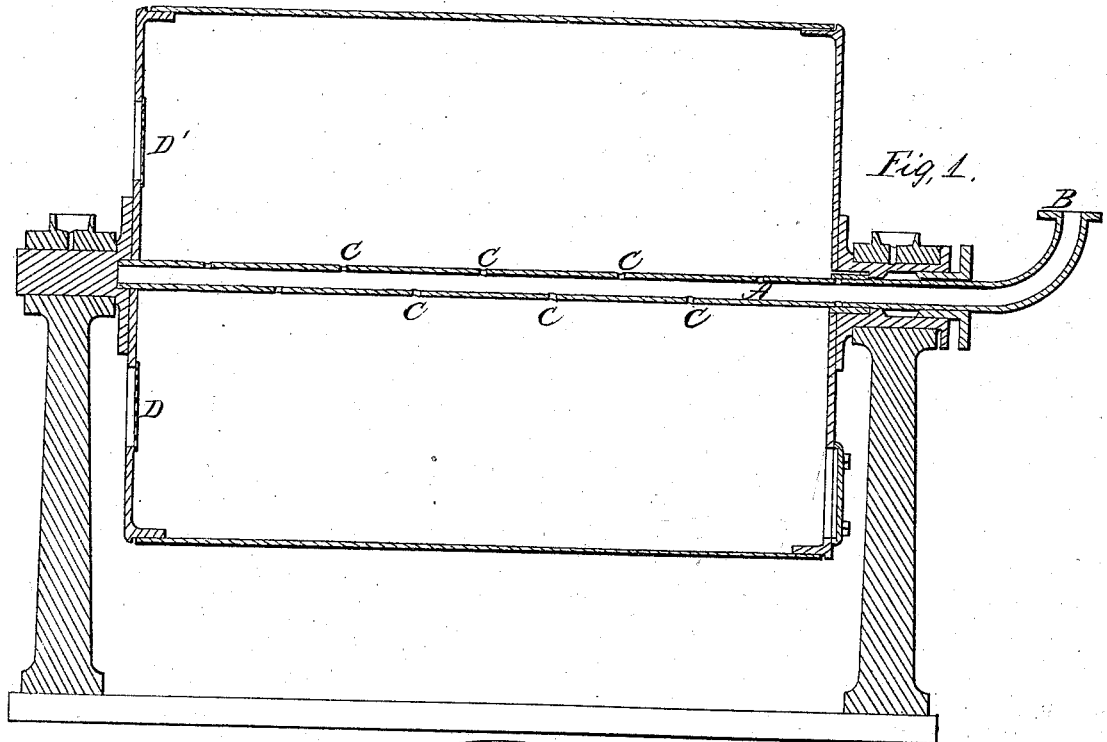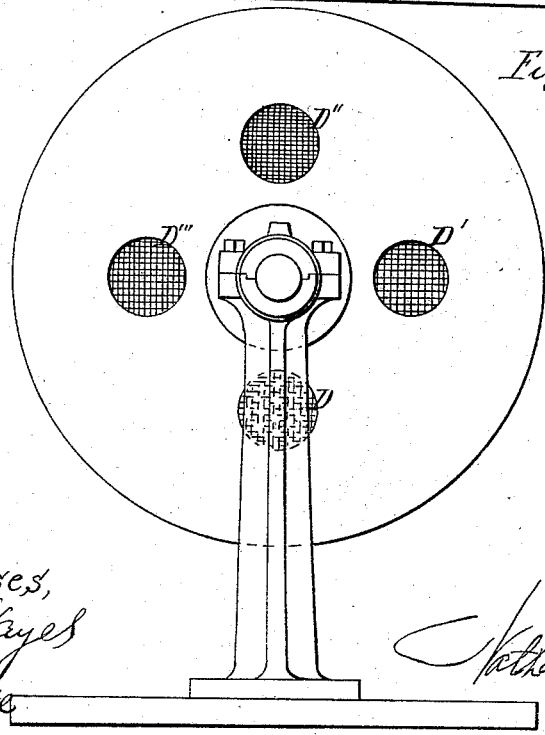

NATHANIEL C. SAWYER, OF BOSTON, MASSACHUSETTS.

IMPROVED PROCESS OF SEPARATING CRUDE EMERY FROM FOREIGN SUBSTANCES.

Specification forming part of Letters Patent No. 58,487, dated October 2, 1866.

*To all whom it may concern:*

Be it known that I, NATHANIEL C. SAWYER, of Boston, in the county of Suffolk and Commonwealth of Massachusetts, have invented a new and Improved Process of Separating Crude Emery from Foreign Substances, and rounding and polishing the same; and I do hereby declare that the following is a full and exact description thereof.

The mineral emery, or pure alumina in combination with peroxide of iron, so invaluable for cutting and polishing the harder metals, has not been found in this country until the discovery, in the autumn of 1864, of the immense mine of this mineral in Chester, Massachusetts. Upon the development of this mine and the attempt to prepare the mineral into a marketable form, it was found that owing to the peculiar character of the emery and associated minerals, and the total absence of experience in the treatment of such mineral, all the processes required for the preparation of the emery into a marketable form had to be ascertained by experiment.

The emery as it occurs at the Chester mine is found in two forms—the compact emery, which is very close and fine grained in its structure, the fracture being made with great difficulty; and the granular emery, which occurs in flattened grains, which rarely touch each other, and are disseminated through a rather open and comparatively soft green chlorotoid mineral, usually denominated "chlorite." The granular mineral cleaves without difficulty into slaty fragments of a few inches in thickness, and is easily comminuted. The disseminated grains of emery are of great purity, surpassing any known in commerce. It is requisite that the grains of emery, when brought into a commercial form, should be absolutely free from any softer extraneous mineral, a slight coating of the powder of a softer mineral preventing the adhesion of the grains of emery to the glue in the ordinary mode of applying this mineral to emery-wheels for grinding or polishing. Various attempts were made to separate the soft chlorotic mineral from the grains of emery when the gangue-rock containing the emery had been comminuted. All proved ineffectual until the process which I shall proceed to describe had been discovered and perfected.

I will now proceed to describe the operation of my process. I take the gangue-rock from the mine containing emery, chlorite, margarite, or any foreign mineral or substance requiring to be separated from the pure emery, and after reducing the whole to the required state of comminution in any suitable crusher, place this material—viz., the powdered emery—together with the accompanying powdered minerals, in a drum or hollow cylinder constructed of wrought-iron, cast-iron, or wood, the former being preferred. The size of the drum is immaterial, that which I use being about four feet in length by three feet in diameter. This drum is provided with journals upon which it may revolve, and is connected with any suitable power. It is made to revolve slowly—say, from fifteen to twenty revolutions per minute, but may be made to revolve more rapidly. Blocks of hard wood, or pieces of hard metal, the former being preferable, are introduced into the drum together with the emery. These blocks are rolled round with the emery, and serve to prevent the clogging of the mineral, and, by their friction with it, aid in the separation of the extraneous mineral from the grains of emery, while at the same time they aid in rounding and polishing the grains of emery.

In order to remove the softer mineral, which has a less specific gravity, and is therefore separable, from the interior of the drum, I use one of two processes. The journal upon which the drum revolves is made hollow, and I introduce a stream of water through the journal through perforations in the same.

The water escaping through apertures provided with wire-gauze in the end of the drum carries away the finer portions of the softer mineral, which has been reduced to powder by comminution.

I do not limit myself to any particular mode of introducing water into the drum or of providing for its escape. The mineral suspended in the water which escapes from the drum, together with such emery as it may contain, is conducted into troughs or labyrinths, where it is deposited according to the size of the suspended particles and their specific gravity.

The other process which I adopt for expelling the extraneous mineral from the drum is conducting a current of air from a blower or bellows through the hollow journal into the interior of the drum, the powdered extraneous mineral being blown through apertures provided with wire-gauze in the end of the drum opposite to that at which the air enters.

When the object is the preparation of the compact emery, or emery free from softer extraneous minerals, I dispense with the currents of water or air.

The grains of pure emery, after the crude material has been subjected to this process, are absolutely free from any foreign material. They are in the condition to be further separated by proper sieves, according to the number required. Each particle of emery has perfect abrading-surfaces, and can be brought into absolute contact with the glue, by which it is made to adhere to the wheel, or with the metal to be abraded. A second effect is produced by submitting the emery to this process either with or without the currents of water or air. The grains of the emery are rounded, and the angles and sharp projecting points are removed, and a smoothness and uniformity given to each grain, which adds greatly to the value of the commercial article.

I do not limit myself to any particular form of drum or apparatus for introducing the air or water into the interior of the drum, but represent that which I use better to illustrate my process of treating the crude comminuted emery, which process, being of the nature of a metallurgical one, constitutes the essence of my invention.

The apparatus which I use in my process is shown in the annexed drawings, making a part of my specification.

Figure 1 is a section of the hollow drum above referred to. A is the hollow shaft or journal, the water or air entering at B and escaping at c c c c. Two of the apertures for the escape of water or air are shown at D D'. Fig. 2 is an elevation of the end of the drum opposite to that at which the water or air enters.

The apertures for the escape of the water or air with wire screens are represented at D D' D'' D'''.

I am aware that revolving drums or hollow cylinders are quite commonly used for cleaning the molding-sand from iron castings, and also for polishing small metallic articles. I therefore do not claim in this application the mechanical apparatus described, reserving the right to claim hereafter such mechanical arrangements as are new. Nor do I claim the treatment of anything by my process but emery, and I am not aware that emery has ever been cleaned and separated from extraneous softer minerals, or rounded and polished, in the way which I have discovered and described.

What I claim as my invention, and desire to secure by Letters Patent, is—

1. The process of cleaning emery and separating it from extraneous softer minerals and other substances by motion and friction in revolving hollow cylinders or receptacles, in connection with the introduction of currents of water or air into such cylinders or receptacles, to facilitate the separation and escape of such extraneous materials, substantially as set forth.

2. The process of polishing and rounding emery by subjecting it, when ground or crushed, to friction in hollow revolving cylinders or receptacles without currents of air or water, substantially as set forth.

NATHANIEL C. SAWYER.

Witnesses:
JOHN L. HAYES,
BYRON ROSE.